INVENTOR
BRIAN O'BRIEN

INVENTOR
BRIAN O'BRIEN

INVENTOR
BRIAN O'BRIEN
ATTORNEYS

May 21, 1957 B. O'BRIEN 2,792,746
WIDE ANGLE PICTURE PROJECTION OPTICAL
SYSTEMS AND SCREEN APPARATUS
Filed Aug. 3, 1953 5 Sheets-Sheet 5

INVENTOR
BRIAN O'BRIEN
BY
ATTORNEYS

United States Patent Office 2,792,746
Patented May 21, 1957

2,792,746

WIDE ANGLE PICTURE PROJECTION OPTICAL SYSTEMS AND SCREEN APPARATUS

Brian O'Brien, Pomfret, Conn., assignor to American Optical Company, Southbridge, Mass., a voluntary association of Massachusetts Application August 3, 1953, Serial No. 371,943

22 Claims. (Cl. 88—24)

This invention relates to a combined wide angle photographic and projection system including a printing process or processes and apparatus for obtaining and modifying wide angle pictures taken by a distortion introducing camera lens system of predetermined characteristics in such a manner that when such pictures are projected onto an associated wide angle viewing screen of proper curvature from a predetermined projection position appreciably angularly above or below a line normal to the center of the screen (considered both horizontally and vertically), said wide angle pictures upon the viewing screen will appear, to persons located centrally within a predetermined audience area in front of the screen, or to the opposite side of said normal from said projection position, to be substantially free from distortion.

In copending O'Brien application, Serial No. 346,953, filed April 6, 1953, there is disclosed a combined photographic and projection system for obtaining wide angle picture images having controlled amounts of distortion therein and thereafter projecting said pictures images onto a wide angle viewing screen of controlled curvature in such a manner that when the pictures are viewed by a person located substantially at or near the predetermined center of perspective or optical center in front of the screen the person will observe a wide angle picture nearly completely free from distortion.

In copending O'Brien application, Serial No. 368,114, filed July 15, 1953, there is disclosed a photographic printing process whereby such a distortion containing wide angle camera picture image of the first-mentioned application may be rectified to provide substantially complete freedom from distortion even in the outer lateral corner portions of the picture; with the results that elongated straight vertical objects or lines, for example, near the opposite lateral edge portions of such wide angle pictures will appear to be entirely free from distortion when viewed upon the curved wide angle viewing screen in the manner mentioned above.

While the combined photographic and projection system of the first-mentioned application and the printing process of the second-mentioned application together will provide substantially distortion-free wide angle pictures upon said wide angle viewing screen to persons located near said predetermined center of perspective and substantially directly in front of the center of said screen and when the projector is likewise positioned at a projection position substantially directly in front of said center of screen and at a proper distance therefrom, nevertheless such wide angle pictures will not be free from distortion if the projector is moved to a different projection position an appreciable angular amount directly above or below a normal extending from the center of the viewing screen and if, for example, the position of the person viewing the wide angle picture is moved in the opposite direction to a new location having substantially the same angular relation to said normal.

On the other hand, for practical purposes it is generally desirable to have the projection axis in a theater and the line of sight from the center of the audience area therein appreciably displaced predetermined angular amounts relative to said normal line extending from the center of the viewing screen, which angular amounts will depend usually upon the type, size and arrangement of theater being served.

The present invention is intended, therefore, to provide a photographic and projection system for taking wide angle picture images having controlled distortion, rectifying portions of the picture image, and modifying final picture image shape by providing a combined droop and keystoning effect therein with the result that the projected image on the viewing screen will appear to be free from distortion to persons properly located in an audience area in front of the screen.

The invention also provides a printing process and associated apparatus whereby controlled amounts of image modification and keystoning may be provided, in such a wide angle distortion-containing and rectified camera picture, to produce a modified film image which when displayed upon said viewing screen will appear to a person seated near said center of perspective to be a substantially distortion free picture, notwithstanding the fact that the person is disposed angularly a predetermined amount above or below said normal extending from the screen or the fact that the projector providing the picture upon the viewing screen is disposed angularly a substantially equal amount to the opposite side of said normal.

While it has been mentioned that the image characteristics of the picture upon the viewing screen may be modified by following the teaching of the present invention so as to appear correct to a person seated in the audience area near the center of perspective or optical center of the theater, it should also be noted that it might be more desirable to have the image modification arranged to provide the best correction for persons located rearwardly of the center of perspective, such as at the center of gravity of a predetermined audience area. This desirable condition may also be accomplished by following the teachings of the invention.

It is, accordingly, an object of the present invention to provide a novel method, and apparatus therefor, whereby distortion containing wide angle picture images may be obtained by photographic means, conditioned by a printing technique or printing steps, and thereafter projected onto a wide angle viewing screen of controlled horizontal cylindrical curvature from a preselected position a predetermined angular amount above or below a line extending normally relative to the surface of said screen at the center thereof, and viewed by a person properly positioned at a substantially equal angular amount to the opposite side of said normal line, as a substantially distortion-free picture image of the scene originally photographed.

It is also an object of the present invention to provide a photographic printing method and associated printing apparatus whereby film images having controlled image characteristics may be obtained for subsequent projection upon a wide angle viewing screen of controlled horizontal curvature from a predetermined projection position an appreciable angular amount above or below the normal extending from the center of said screen for viewing by a person near the optical center of the theater and at substantially the same angular amount but to the opposite side of said normal with substantially complete freedom from distortion.

It is an additional object of the invention to provide a method and apparatus whereby a wide angle photographic film image having controlled amounts of distortion therein may be obtained and modified by a printing method so as to allow angular projection onto said screen from above or below the normal to the center of the screen and present upon the curved viewing screen a picture well corrected for distortion to persons properly positioned relative to said viewing screen and somewhat rearwardly of the optical center of the theater.

It is an object of the invention to provide a theater arrangement for viewing wide angle pictures comprising a horizontally curved wide angle viewing screen of predetermined configuration, said wide angle screen when viewed from a center of perspective comprehending a range between approximately 90 and 140 degrees, a projector positioned in predetermined spaced relation relative to said viewing screen at the concave side thereof and vertically spaced a predetermined angular amount relative to a line extending normally from the center of said screen and an audience area in front of the concave side of said screen containing said center of perspective and having the center of the audience area located somewhat rearwardly of said center of perspective, the configuration of the screen, the angle of projection, the characteristics of the wide angle film image to be projected and the audience area all being so controlled and correlated as to produce a substantially distortion-free picture upon said screen to individuals adjacent said center of perspective, or a picture well corrected for distortion to individuals adjacent said center of audience area.

Another object is to provide a novel film embodying a wide angle distortion containing photographic image for use in a theater arrangement of the character described, and method of making same.

Other objects and advantages of the invention will become apparent from the detailed description of the method and apparatus which follows when taken in conjunction with the accompanying drawings in which.

Figure 1:
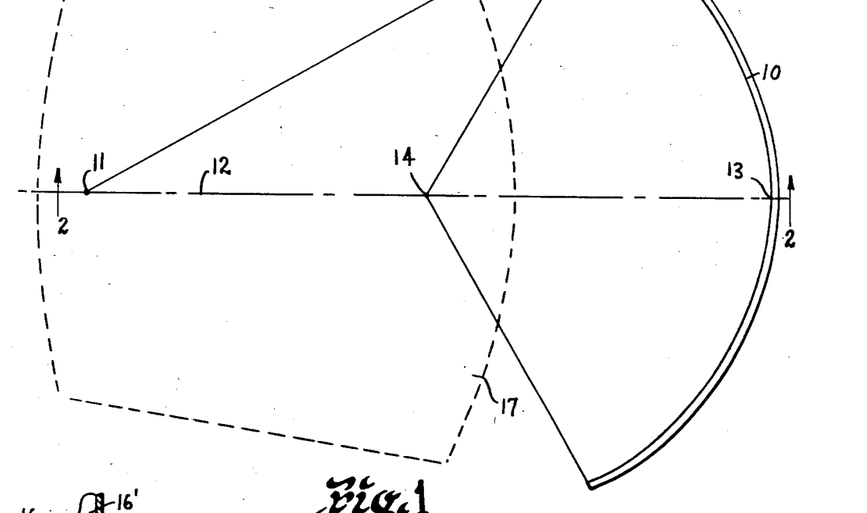
Fig. 1 is a diagrammatic plan view of a theater area embodying the present invention.

Referring to the drawings in detail and particularly to Fig. 1, it will be seen that a plan view of a motion picture theater arrangement is diagrammatically indicated having a wide angle horizontally cylindrically curved viewing screen 10 of carefully controlled curvature and arranged to receive distortion containing picture film images when projected by a projector located at a projection position 11 in front of the concave side of said screen. When the curvature of the viewing screen 10 and the projection distance taken along a line 12 normal to the center 13 of the screen are of proper values to function with the introduced distortional characteristics of the camera film image a person located near the center of perspective or optical center of the theater 14 may observe a screen image which will appear to be nearly free from distortion in all parts thereof.

In the first mentioned application, Ser. No. 346,953, there is described in detail such a combined photographic and projection system using a single wide angle camera lens system for obtaining wide angle pictures having controlled amounts of inward radial distortion and a distortion free projector positioned at a predetermined distance from substantially directly in front of a wide angle screen of carefully controlled horizontal curvature. In this earlier disclosed system, a person located substantially at the center of perspective 14 in front of said screen would observe a nearly distortion free wide angle picture upon the screen.

Figure 2:
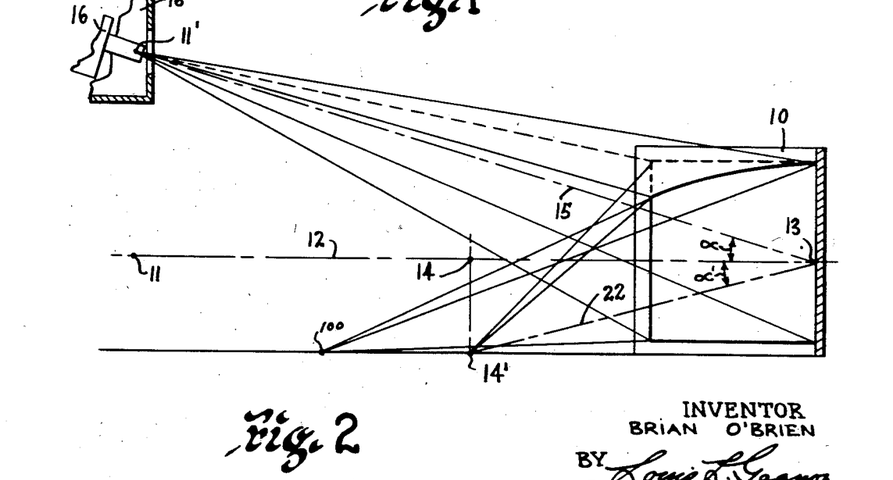
Fig. 2 is a diagrammatic sectional view taken substantially upon line 2—2 of Fig. 1 and looking in the direction of the arrows.

In the present invention, however, it will be noted from Fig. 2, that the optical axis 15 of a projector 16 located at a new projection position 11' directly above the point 11 is directed downwardly toward said center 13 of the wide angle viewing screen and intersects the normal 12 to the screen at center point 13. Thus an appreciable vertical angle $\alpha$ is formed between normal line 12 and the axis 15. Additionally it will be noted in Fig. 2 an observer instead of being located at the center of perspective 14 will be positioned at a new center of perspective 14' directly below the point 14. This new position is such that when the observer is located at this point and is looking in the direction indicated by a line 22 extended towards the center 13 of the screen he will have his line of sight bearing substantially the same angular value $\alpha'$ with respect to the normal 12 as that indicated by $\alpha$.

It is desirable for practical purposes, however, in place of such a "straight head on" type of projection as that discussed in said first mentioned application, No. 346,953, to have the projector located above the position of the person or persons observing the picture, and such a vertically displaced arrangement is shown in Fig. 2. Since the viewing surface of the wide angle curved viewing screen 10 will not look rectangular when viewed from the projection booth 16' located appreciably above the normal 12, and also will not look rectangular to a person located near the new center of perspective or viewing point 14' appreciably below the normal 12, it follows that a wide angle picture which would appear to be distortion free from point 14 if projected onto the screen from point 11, cannot be projected from the new point 11' onto the curved screen and be seen from the new point 14' as a properly shaped picture image.

Modification of the original wide angle distortion containing camera picture, accordingly, is necessary in order that the person or persons in an audience area 17 and generally near the new point of perspective 14' may observe a substantially distortion-free picture. The needed modification of picture image for this vertically displaced type of projection and viewing may be more clearly appreciated if reference is made to Figs. 3 and 4. If the originally photographed scene is for convenience considered as subdivided into a pattern composed of a multiplicity of adjacent squares of equal size such as that indicated at 24 in Fig. 3, it follows that the observer at the new observation position 14' in Fig. 4 should seem to observe a similarly shaped pattern when looking upwardly and forwardly at the substantially vertically arranged viewing screen 10, notwithstanding the fact that this screen is appreciably horizontally curved and the fact that the picture image is being projected downwardly and forwardly onto the screen 10.

Figure 3:
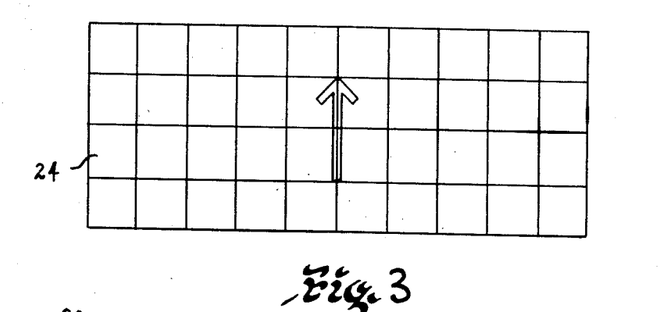
Fig. 3 is an original pattern for use in providing a clear understanding of the invention.
Figure 4:
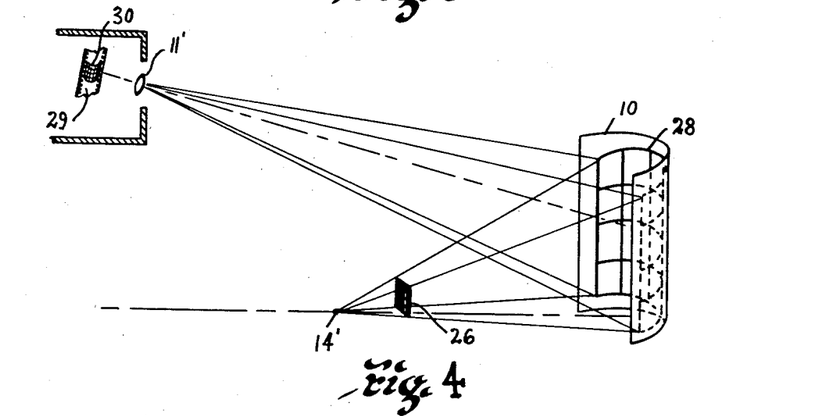
Fig. 4 is a diagrammatic sketch showing parts of a theater in perspective to aid in an understanding of the invention.

The observer at 14' in Fig. 4, in other words, should see a grill-like pattern formed of adjacent squares all sides of which appear to be of equal length and right angularly arranged; and such a pattern is for convenience indicated as an aerial pattern in space at 26 forwardly of the viewing point 14′. Accordingly, lines representing light rays can be traced backwardly from the observer's eye at point 14′ through the corner points of the aerial pattern 26 and same will impinge upon the viewing surface of the screen 10 and form a distorted image indicated at 28. When the corner points of the distorted image 28 are in turn extended backwardly, as by ray tracing, from the screen 10 through the distortion-free projector lens system at new projection position 11′ to the film 29 in the projector 16 the shape of the pattern required on the film will be obtained for a distortion-free picture at th point 14′. The distorted film image on film 29 is diagrammatically indicated by the numeral 30.

Figure 5:
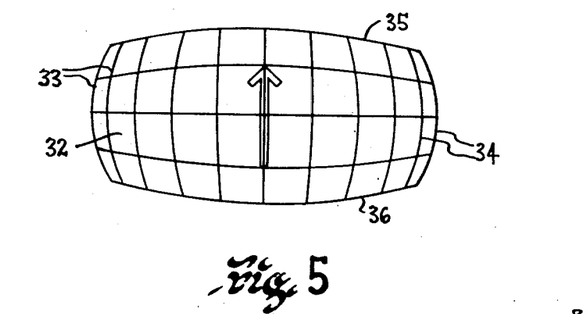
Fig. 5 is a distortion containing photographic image, somewhat exaggerated, of the pattern of Fig. 3.

The original pattern 24 of Fig. 3 when photographed by a distortion-introducing camera lens system as disclosed by the first-mentioned application will have its film image appear somewhat like that indicated at 32 in Fig. 5. In this distorted film image it will be seen that originally straight lines near the lateral marginal portions of the wide angle picture are crowded inwardly somewhat, such as 33, 34, 35 and 36, and in the case of the lines 33 and 34 near the side edges of the wide angle picture image considerable curvature in these originally straight lines is manifested. This film image if projected from point 11 onto the screen 10 would appear nearly completely distortion-free if viewed from point 14. Top and bottom lines 35 and 36 upon the screen, though slightly curved, would appear straight and lines 33 and 34 would appear only slightly curved.

In the printing process disclosed in the second above-mentioned application, No. 368,114, lateral marginal portions of the wide angle camera image 32 may be altered during a photographic printing step with the result that a new rectified picture image 38 (see Fig. 6) may be produced on a second, film to obtain a straightening out effect of these side marginal portions of the picture. This will result in the new side lines 33′ and 34′, corresponding to lines 33 and 34 in Fig. 5, being straightened and rendered vertical with only slight change in the top and bottom lines 35′ and 36′. The desired distorted spacing of the vertical lines intersecting the transverse meridian 42, it will be noted, has remained unchanged when compared with the image 32 of Fig. 5. If this film image 38 is projected onto the curved screen 10 of Fig. 2 from the position 11, a person positioned at the center of perspective 14 would observe a substantially distortion-free picture. The uneven horizontal spacing of the vertical lines intersecting the transverse meridian 42 of the picture would be "spread out" by the controlled curvature of the screen 10, the upper and lower curved edges of the film image 38 would appear straight and the vertical marginal lines would appear straight and parallel to the vertical meridian 43.

Figure 6:
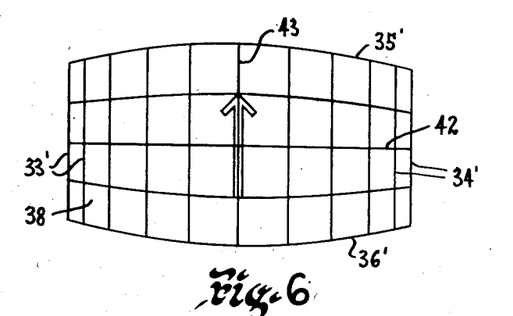
Fig. 6 is a rectified photographic film image of the camera image of Fig. 5.
Figure 7:
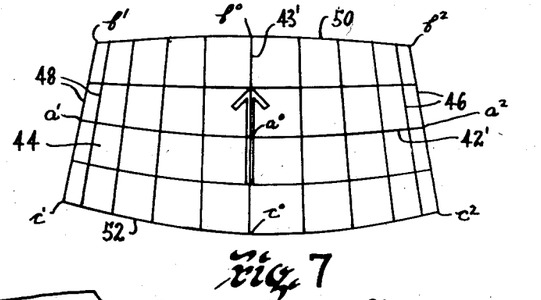
Fig. 7 is a photographic image much like the rectified image of Fig. 6, but having additionally a controlled amount of "keystone" distortion provided therein.

The film image 44 of Fig. 7 on the other hand, while much like the image 38 shown in Fig. 6 and may be obtained by the printing process described in the second-mentioned application, is a modified image containing a controlled amount of "Keystone" effect, as indicated by the inwardly sloping vertically extending lateral marginal lines 46 and 48. The purposes for this introduced keystone effect during film image rectification by the printing step of the second-mentioned application, will be hereinafter more fully described. This introduced keystoning produces a shorter top marginal line 50 and a longer bottom marginal line 52 than the corresponding lines 35′ and 36′ of Fig. 6.

Figure 8:
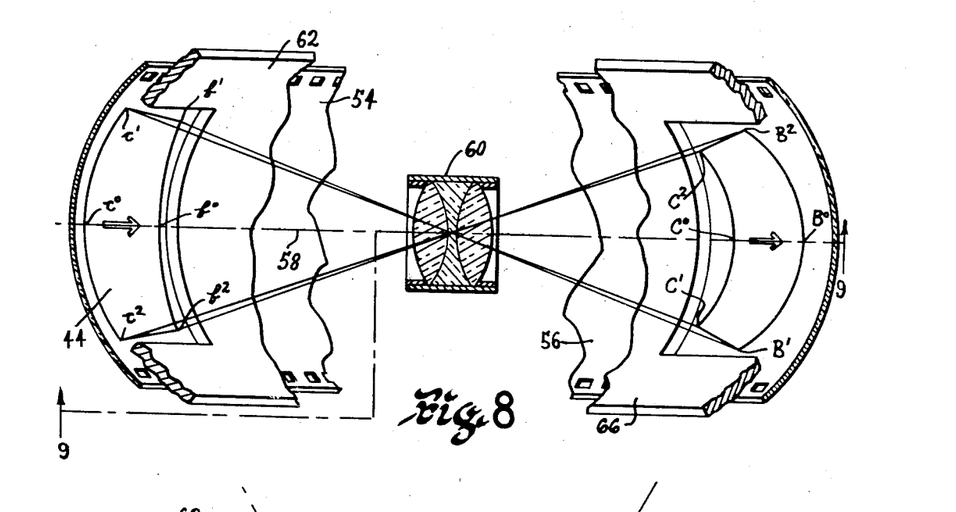
Fig. 8 is a diagrammatic plan view partly in section of apparatus for providing an image modifying printing step of the invention.
Figures 9, 12:
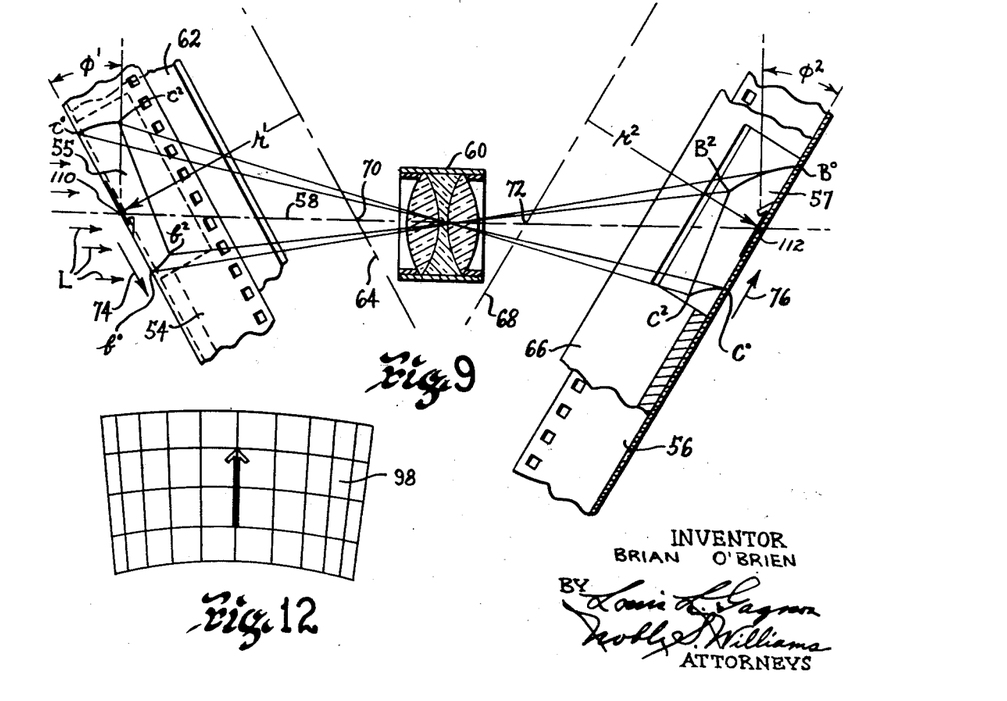
Fig. 9 is a sectional view taken substantially upon line 9—9 of Fig. 8 and looking in the direction of the arrows.
Fig. 12 is a diagrammatic showing of the pattern on the viewing screen of Fig. 1 as seen from a position adjacent the projector thereof.

If a film containing picture images distorted in the manner represented in Fig. 5 and rectified in the manner indicated at 44 in Fig. 7 and thus containing along its transverse and vertical meridians 42′ and 43′ respectively the original distortion resulting from the camera lens taking the picture and the side edge rectification and keystoning obtained by following the printing technique or step of the second mentioned application, is positioned to extend through a suitable printing apparatus, such as that indicated diagrammatically in Figs. 8 and 9, additional image modification upon a third film can be provided in a resulting picture image so that vertically displaced projection and viewing of the wide angle picture with substantially complete freedom from distortion, as previously mentioned, may be obtained.

A film 54 having such a rectified image 55 thereon is shown in Figs. 8 and 9, and will be hereinafter referred to as the "intermediate" film. A third film upon which the modified image is formed is indicated at 56. The image thereon is indicated at 57. This film 56 will be hereinafter referred to as a "release" film since duplicates thereof will be released and distributed to the motion picture theater industry for use thereby for theater projection purposes.

In Figs. 8 and 9, it will be seen the intermediate film 54 is tilted lengthwise thereof an angular amount $\phi^1$ relative to the optical axis 58 of a copying objective 60 and that the release film 56 arranged in a substantially 1 to 1 conjugate relation thereto is angularly disposed preferably an equal amount $\phi^2$ relative to this optical axis but in an opposite direction. The film 54 is also cylindrically curved a predetermined amount in the horizontal direction thereof and maintained in such a shape by a cylindrically curved apertured film gate 62 which has a radius $r^1$ relative to the axis 64 of this cylindrical film gate.

In like manner the light sensitive release film 56 is cylindrically curved in the transverse direction thereof and maintained in such shape during exposure by a second apertured cylindrically shaped film gate 66 having a radius $r^2$ relative to the axis 68 of the cylindrical gate 66. The axes 64 and 68, it should be noted, intersect the optical axis 58 at points 70 and 72 respectively. The films 54 and 56 are moved intermittently longitudinally for successive exposures, the directions of movement being indicated respectively by the arrows 74 and 76. It has been found, for best results, that the copying objective 60 should be of a type having appreciable curvature of field while being well corrected for color and other well known aberrations. Illumination for the film 54 at the film gate 62 is indicated by the arrows L. A short focus objective is preferred.

Figure 10:
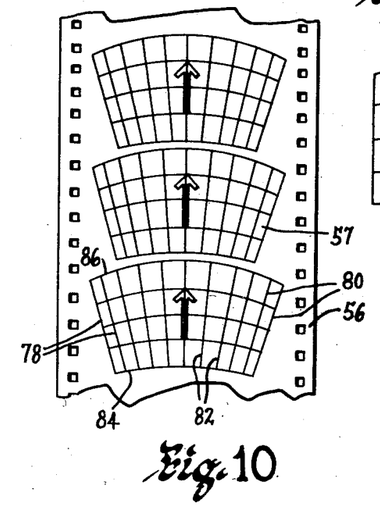
Fig. 10 is a view of photographic strip film having picture images thereon as obtained by the printing technique employed with the apparatus of Figs. 8 and 9.

By arranging the intermediate film 54 and the release film 56 in an angled or "toed in" relation relative to each other and suitably cocavely curved during copying, it is possible to transform an image of the type shown at 44 in Fig. 7 to an image of the type shown at 57 upon the strip film 56 in Fig. 10. While the top and bottom lines 50 and 52 of the image 44 are curved outwardly in opposite directions nearly equal amounts, and the side lines 46 and 48 have keystoning, it will be observed that the image 57 on the release film 56 has the sides or opposite marginal edge portions 78 and 80 thereof appreciably depressed or "drooped" relative to more centrally disposed portions of the picture image, such as lines 82, and also has a compensating keystone effect therein, with the result that the lower edge 84 of the picture image instead of being longer than the upper line 86 will be of appreciably less length than the upper edge 86 thereof.

In Fig. 7 the transverse meridian of the image 44 contains central point $a^0$ and side points $a^1$ and $a^2$, the top edge contains central point $b^0$ and side points $b^1$ and $b^2$, and the bottom edge contains central point $c^0$ and side points $c^1$ and $c^2$. Upper points $b^1$, $b^0$, $b^2$ and lower points $c^1$, $c^0$ and $c^2$ are indicated in the image 44 in Fig. 8. These points are re-imaged by the objective 60 upon the release film 56 at corresponding points $B^1$, $B^0$, $B^2$ and $C^1$, $C^0$ and $C^2$. The points $b^0$, $b^2$, $c^0$ and $c^2$ on film 54 and corresponding points $B^0$, $B^2$, $C^0$ and $C^2$ on film 56 are also indicated in Fig. 9.

The angles $\phi^1$ and $\phi^2$ may be varied like amounts but in opposite directions of rotation when different amounts of "droop" effect is desired in the final image 57. An increase in the value of $\phi^1$ and $\phi^2$ will cause greater "droop" and, conversely, a decrease will produce less "droop." When the "droop" effect is increased in this manner, the keystone effect in the resulting image 57 will be increased and when the "droop" is lessened, the keystone effect in the resulting image will be lessened. This change in keystoning when not of proper value may be compensated for in the earlier step for producing the image of Fig. 7 as described in the second-mentioned application.

Figure 11:
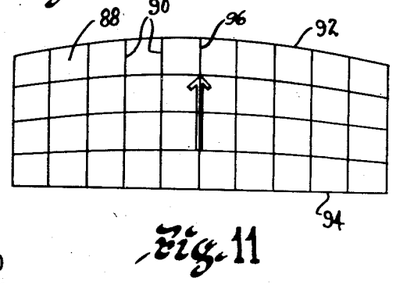
Fig. 11 is a diagrammatic showing of the modified and rectified image of the pattern of Fig. 3 as provided upon the viewing screen of Fig. 1.

The processed release film, of course, would be inverted when disposed within the motion picture projector with the result that the "drooped" effect of the individual picture images 57 on the film 56 will have their central portions extending or displaced downwardly with reference to the side marginal portions thereof, as indicated at 30 on strip film 29 in Fig. 4. This image 57, however, when projected onto the viewing screen 10 would provide a pattern thereon which would be, if the screen were unfolded so as to extend in a single plane, approximately like that shown at 88 in Fig. 11 wherein its vertical lines 90 are substantially parallel to each other and parallel to vertical meridian 96, its top line 92 appreciably upwardly arched and its bottom line 94 nearly straight or slightly downwardly arched.

While the projected pattern upon the viewing screen 10 may look somewhat like that shown at 98 in Fig. 12 from an elevated point somewhat below the projection booth 16', compressed, drooped at its edges and with keystoning, it will nevertheless appear, when viewed from a location in the audience area and near the point 14' in substantially true proportions similar to the original pattern 24 in Fig. 3.

It may well be that the audience area 17 located in front of the concave horizontally curved wide angle viewing screen 10 (see Figs. 1 and 2) will have its center of gravity located appreciably rearwardly of the new center of perspective 14' and such a center is indicated by point 100 in Fig. 2. At such times it will be desirable to modify the screen image 28 somewhat and possibly also decrease the values of the angles $\alpha$ and $\alpha'$ by tilting the viewing screen 10 slightly away from the audience area. This last-mentioned modification would be such as to lessen the curvature of the top edge of the screen image 92 without appreciably altering other desired distortional characteristics of the release film image 57. It may be accomplished by following the teachings of said second-mentioned application Ser. No. 368,114, wherein there is disclosed a second printing step following a first printing step for rectification of vertical side lines of the original camera film. Side edges are bent inwardly toward the printing objective prior to this additional printing step for producing the film image 44. The release film 56 would then be made and would incorporate this modification.

Depending upon theater conditions, the angles $\alpha$ and $\alpha'$, of Fig. 2 will vary and a range between 5 and 30 degrees might be encountered an could be accommodated. In theaters, when the floor 112 of the orchestra slopes downwardly and forwardly as indicated by the angle $\theta$ in Fig. 15, the screen 10 might be tilted rearwardly away from the audience area various limited amounts as indicated by the angle $\gamma$. The angles $\theta$ and $\gamma$ may be equal or the angle $\gamma$ may be somewhat greater or less or less than $\theta$. The amount of compensating keystone effect in the final film image on film 56 (see Fig. 10) would be adjusted accordingly and the curve of the top and bottom lines 92' and 94' in Fig. 15 would be modified in accordance with the distance from the point 100 to the viewing screen so that these lines would appear to be substantially straight and parallel to each other. Such a tilting of the screen and the increased viewing distance to the point 100 might in effect lessen the vertical displacement and thus $\alpha^3$ and $\alpha^4$ would be of lesser values.

Figure 13:
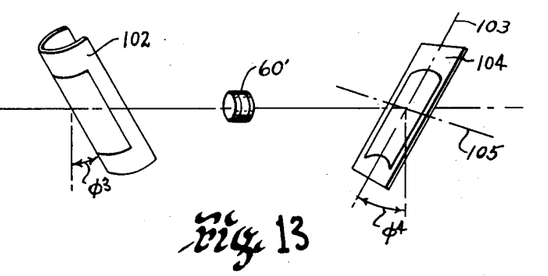
Fig. 13 is a modification of the printing technique of Figs. 8 and 9.
Figures 14, 15:
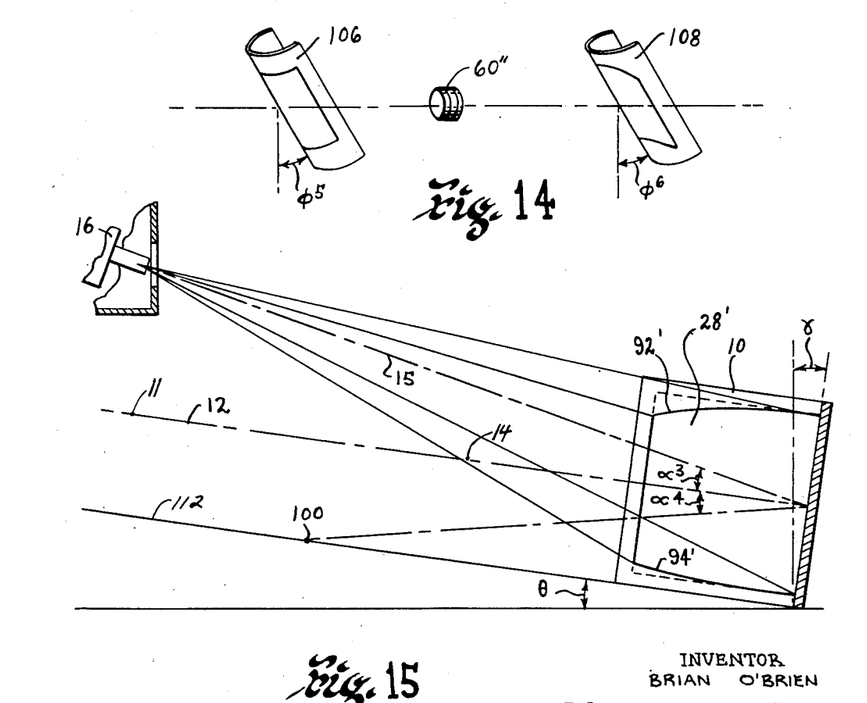
Fig. 14 is an additional modification thereof.
Fig. 15 is a view generally similar to Fig. 2, illustrating a modification thereof.

Modified forms of printing which may be employed to advantage with the present invention are shown in Figs. 13 and 14.

It might be at times desirable to alter or adjust slightly the horizontal magnification of the image 57 in film 56 (considered along the horizontal meridian thereof) to provide an increase or decrease in magnification thereof. When such adjustment is to provide a decrease in magnification, the film gate 66 of Fig. 8 would be provided with a lesser amount of curvature while the film gate 62 would be correspondingly provided with an increased curvature. An extreme condition in this direction would be when film 104 has a very shallow curve or is nearly flat as shown in Fig. 13 and film 102 is sharply curved. Such a condition is shown in Fig. 13. For an increase of magnification in image 57, an opposite condition would be employed wherein a lesser curvature is provided with the film gate 62 and a greater curvature provided the film gate 66. An extreme condition in this direction would have the film gate 62 nearly flat. Adjustment of the angles $\phi^3$ and $\phi^4$, preferably equal amunts but in opposite directions, would provide the desired control for droop effect in the resulting image. Keystoning, of course, would also be effected and if the compensating effect thereof is not exactly the amount desired, this condition might be in effect adjusted initially in the printing step disclosed in said second-mentioned application. In the arrangement of Fig. 13, the copying objective 60' would be, like that shown at 60 in Figs. 8 and 9, of a type having considerable curvature of field present therein.

It might be desirable to introduce varying amounts of droop into the release film picture image without the introduction of any keystone effect. This could be accomplished by an arrangement such as that shown in Fig. 14. In Fig. 14, a modified printing arrangement is shown in which a flat field printing objective 60" is used and wherein the angles of tilt $\phi^5$ and $\phi^6$ are preferably equal and arranged in the same direction. In this printing arrangement, varying amounts of droop effect may be provided in the film image upon release film 108 by adjustment of the angles $\phi^5$ and $\phi^6$, and a control of the magnification along the horizontal meridian may be had by a slight change of related curvatures of the film gates supporting films 106 and 108 but no keystone effect would be provided in the resulting image upon film 108. The cylindrical curvatures of both films 106 and 108 preferably would be equal to each other but their magnitude could be varied as conditions required for change in horizontal meridianal magnification. In this instance, the control of the resultant keystoning of the image 57 is introduced earlier by the printing technique set forth in said second-mentioned application for the forming of the image upon intermediate film 54. The film gate supports 62 and 66 would be provided with suitable means (not shown) for supporting same in optical alignment with the objective 60 and for allowing tilting about transverse pivotal axes 110 and 112 (see Fig. 9) to change the angular value of $\phi^1$ and $\phi^2$; whereby said film gates may be adjusted and secured in different angular positions during use thereof.

While Fig. 2 has been arranged to represent a theater area in which the projection booth is disposed to project over the heads of persons in the audience area, a converse arrangement may be at times desirable, as in a drive-in type of theater, wherein the projection axis from the projection booth might be located at a location below the line of sight, generally speaking, from the preferred location in the audience area. In such a case, the concave viewing screen might be tilted towards the audience area an amount to compensate for such conditions, and the lower edge of the screen image would, in fact, have the greater curvature so as to appear correct when viewed.

It is pointed out that the wide angle viewing screen of Figs. 1 and 2 need not be exactly of rectangular shape but could be, if desired, either masked or shaped to fit approximately the perimeter of the picture image being projected thereon with the result that a more pleasing effect would be created in the mind of the observer.

Having described my invention, I claim:

1. A method of producing a wide angle picture image on film for use with a theater arrangement embodying a controlled audience area, a wide angle screen of controlled horizontal concave curvature located at a given position relative to said audience area as to provide a given angle of viewing to individuals adjacent a predetermined preferred viewing point centrally of the width of said area, and a projector located at a given distance from said screen and at a controlled vertical angle with respect to the center of said screen and to said predetermined point in said audience area, said method comprising photographing on a first film a wide angle scene, and optically projecting an image of said photographed scene onto a portion of a second film while said portion is held in a transversely curved and vertically tilted relation with respect to the optical printing axis extending from the first film, so as to introduce in the photographed image on said second film distortional characteristics which are controlled according to the position and curvature of the wide angle screen, the projection distance and angle of projection and said predetermined preferred viewing point in said audience area, whereby the resultant picture as viewed on the wide angle screen will appear to be substantially free of distortion to said individuals adjacent said predetermined point in said audience area.

2. A method of producing a wide angle picture image on film for use with a theater arrangement embodying a controlled audience area, a wide angle screen of controlled horizontal concave curvature located at a given position relative to said audience area so as to provide a given angle of viewing to individuals adjacent a predetermined preferred viewing point centrally of the width of said area, and a projector located at a given distance from said screen and at a controlled vertical angle with respect to the center of said screen and to said predetermined point in said audience area, said method comprising photographing on a first film a wide angle scene and optically projecting an image of said photographed scene onto a portion of a second film while said portion is held in a transversely curved and vertically tilted relation with respect to the first film, so as to introduce in the photographed image on said second film distortional characteristics which are controlled according to the position and curvature of the wide angle screen, the projection distance and angle of projection and said predetermined preferred viewing point in said audience area, whereby components in the screen picture which normally will exhibit major factors of distortion such as droop and keystone effect will be corrected to reduce said distortion to a minimum when viewed by individuals adjacent said predetermined point.

3. A method of producing a wide angle picture image on film for use with a theater arrangement embodying a controlled audience area, a wide angle screen of controlled horizontal concave curvature located at a given position relative to said audience area so as to provide a given angle of viewing to individuals adjacent a predetermined preferred viewing point centrally of the width of said audience area and vertically spaced from a line normal to the surface of the screen at the center thereof, and a projector located at a given distance from said screen and at a controlled acute vertical angle with respect to a line normal to the center of said screen and with respect to said predetermined point in said audience area, said method comprising photographing on a first film a wide angle scene and optically projecting an image of said photographed scene onto a portion of a second film while said portion is held in a transversely curved and vertically tilted relation with respect to the first film, so as to introduce in the photographed image on said second film distortional characteristics which are controlled according to the curvature of the wide angle screen, the position of said screen relative to the audience area, the distance from said projector to said screen and angle of projection, and according to said predetermined preferred viewing point in said audience area, whereby components in the screen picture which normally will exhibit major factors of distortion such as droop and keystone effect will be corrected to reduce said distortion to a minimum when viewed by individuals adjacent said predetermined point.

4. The method of producing a distortion-containing image upon photographic film for use with a theater arrangement embodying a wide angle viewing screen of predetermined horizontal concave curvature and a projector located at a given distance from said screen and displaced vertically a preselected angular amount with respect to a normal extending from the center of said screen, said method comprising photographically recording upon a first recording medium an optical image of a wide angle scene and simultaneously introducing into said image along the horizontal meridian thereof laterally foreshortened distortional characteristics which progressively increase at a predetermined rate from the center to the opposite side edges thereof, optically projecting said image onto a vertically concavely curved portion of a second recording medium in such a way as to form thereon a second image having similar laterally foreshortened distortional characteristics along its horizontal meridian, and additionally having near its opposite side edge portions, at locations spaced vertically from said last-mentioned horizontal meridian, laterally elongated distortional characteristics which are such as to provide to objects near the opposite side edge portions of the photographed scene an upright appearance, and thereafter optically projecting said second image onto a transversely concavely curved portion of a photosensitive film while said transversely curved portion is held in a tilted position at a predetermined vertical angle relative to projection printing axis extending between said second image and said transversely curved portion so as to cause the image being formed on said transversely curved portion to be vertically displaced at all locations intermediate its opposite side edges, while retaining along its horizontal meridian similar laterally foreshortened distortional characteristics, and while also retaining said side edge rectifications, said vertical displacements being such as to provide to the horizontal meridian thereof a predetermined vertical curvature of such controlled value as to tend to counteract the droop effect in the screen image which would otherwise result from the concave curvature of the screen and the off-normal position of the projector whereby, when said film image is projected onto said viewing screen by said projector so spaced from said screen, a wide angle picture will be formed upon said screen which will appear from at least one preferred location in an audience area facing the concave side of said screen to be well corrected for distortion.

5. The method of producing a distortion-containing image upon photographic film for use with a theater arrangement embodying a wide angle viewing screen of predetermined horizontal concave curvature and a projector located at a given distance from said screen and displaced vertically a preselected angular amount with respect to a normal extending from the center of said screen, said method comprising photographically recording upon a first recording medium an optical image of a wide angle scene and simultaneously introducing into said image along the horizontal meridian thereof laterally foreshortened distortional characteristics which progressively increase at a predetermined rate from the center to the opposite side edges thereof, and thereafter optically projecting said image onto a transversely concavely curved portion of a photosensitive film while said transversely curved portion is held in a tilted position at a predetermined vertical angle relative to a projection printing axis extending between said image and said transversely curved portion so as to cause the image being formed on said transversely curved portion to be vertically displaced at all locations intermediate its opposite side edges, and while retaining along its horizontal meridian similar laterally foreshortened distortional characteristics, said vertical displacements being such as to provide to the horizontal meridian thereof a predetermined vertical curvature of such controlled value as to tend to counteract the droop effect in the screen image which would otherwise result from the concave curvature of the screen and the off-normal position of the projector, whereby, when said film image is projected onto said viewing screen by said projector so spaced from said screen, a wide angle picture will be formed upon said screen which will appear from at least one preferred location in an audience area facing the concave side of said screen to be well corrected for distortion.

6. A method of producing a wide angle film picture image for use with a theater arrangement embodying a controlled audience area, a wide angle screen of controlled horizontal curved curvature located at a given position relative to said audience area so as to provide a given angle of viewing to individuals adjacent a predetermined preferred viewing point centrally of the width of said audience area and vertically spaced from a line normal to the surface of said screen at the center thereof, and a projector located at a given distance from said screen and at a controlled acute vertical angle with respect to said line normal to the surface of the screen, said method comprising the step of photographing on film a wide angle picture and simultaneously introducing into the photographed image distortional characteristics controlled according to the position and curvature of the wide angle screen, the distance of said projector from said screen and the angle of projection thereof, and said predetermined preferred viewing point in said audience area, a second step of altering and controlling the distortional characteristics of selective components in the side edge portions of said photographed image by lateral change in image magnification to rectify the shape of said components as viewed on the screen from said predetermined preferred viewing point, and a third step of controlling during projection printing onto a third film the distortional characteristics of selective components of said photographed image intermediate the opposite side edges according to the curvature of the screen, the angle of viewing from said predetermined viewing point and said angle of projection of the picture image onto said screen, said second step being so controlled, in addition to said rectification, as to introduce a predetermined amount of keystone distortion in said film image produced thereby which will be opposite to an error of keystoning which will otherwise be introduced in said image by said third step, whereby components in the screen picture which normally will introduce major factors of distortion will be corrected so as to reduce said distortion to a minimum when viewed on the screen by individuals adjacent said predetermined preferred viewing point centrally of the width of said audience area.

7. The method of producing a distortion-containing image upon photographic film for use with a theater arrangement embodying a wide angle viewing screen of predetermined horizontal concave curvature and a projector located at a given distance from said screen and displaced vertically a preselected angular amount with respect to a normal extending from the center of said screen, said method comprising photographically recording upon a first recording medium an optical image of a wide angle scene and simultaneously introducing into said image along the horizontal meridian thereof laterally foreshortened distortional characteristics which progressively increase at a predetermined rate from the center to the opposite side edges thereof, optically projecting said image onto a vertically concavely curved portion of a second recording medium which is also vertically tilted with respect to a projection printing axis extending from said first image to said curved portion in such a way as to form on said curved portion a second image having similar laterally foreshortened distortional characteristics along its horizontal meridian, having a keystone effect at its opposite side edges, and additionally having near its opposite side edge portions, at locations spaced vertically from said last-mentioned horizontal meridian, laterally elongated distortional characteristics which are such as to provide to objects near the opposite side edge portions of the photographed scene an upright appearance, and thereafter optically projecting said second image onto a transversely concavely curved portion of a photo-sensitive film while said transversely curved portion is held in a tilted position at a prdetermined vertical angle relative to a projection printing axis extending between said second image and said transversely curved portion so as to cause the image being formed on said transversely curved portion to be vertically displaced at all locations intermediate its opposite side edges and to have a predetermined amount of keystone distortion therein, while retaining along the horizontal meridian of said second image similar laterally foreshortened distortional characteristics, and while also retaining said side edge rectification, said vertical displacement being such as to provide to the horizontal meridian thereof a vertical curvature of such controlled value as to tend to counteract the droop effect in said screen image which would otherwise result from the concave curvature of the screen and the off-normal position of the projector, whereby, when said film image is projected onto said viewing screen by said projector so spaced from said screen, a wide angle picture will be formed upon said screen which will have all vertical lines in all parts of the photographed scene correctly vertically disposed, and which from at least one preferred location in an audience area facing the concave side of said screen will appear to be well corrected for distortion.

8. A method of printing and of altering selective components of a wide angle picture image having controlled distortional characteristics photographically introduced therein and having selective components thereof rectified by a subsequent printing technique, said method comprising supporting a first film having said wide angle picture image thereon in a given vertically tilted angular position with respect to the optical axis of an objective, supporting a second film having light sensitive means thereon in a given vertically tilted angular position with respect to the optical axis of said objective and projecting an image of said wide angle picture image from said first film onto said second film and controlling the related transverse shapes of said films with at least one being transversely curved and the angular positions thereof with respect to each other and with respect to the optical axis of said objective, so as to introduce controlled distortional characteristics in selected components of the resultant picture image on said second film, and which distortional characteristics are different from those initially possessed by said components of said wide angle picture image.

9. A method of printing and of altering selective components of a wide angle picture image having controlled distortional characteristics photographically introduced therein and having selective components thereof rectified by a subsequent printing technique, said method comprising transversely curving and supporting a first film having said wide angle picture image thereon in a given vertically tilted angular position with respect to the optical axis of an objective and with the concave side thereof facing said objective, transversely curving and supporting a second film having light sensitive means thereon in a given vertically tilted angular position with respect to the optical axis of said objective and with the concave side thereof facing said objective, and projecting an image of said wide angle picture image on said first film onto said film having the light sensitive means thereon and controlling the related transversely curved shapes of said films and the angular positions thereof with respect to each other and with respect to the optical axis of said objective so as to introduce controlled distortional characteristics in selected components of the resultant picture image on said second film and which are such as to provide different amounts of vertical displacement in different parts of said resultant wide angle picture image intermediate the side edges thereof.

10. A method of printing and of altering selective components of a wide angle picture image having controlled distortional characteristics photographically introduced therein and having selective components thereof rectified by a subsequent printing technique, said method comprising transversely cylindrically curving and supporting a first film having said wide angle picture image thereon with the axis of the cylinder in a given vertically tilted angular position with respect to the optical axis of an objective and with the concave side of said cylindrical curvature facing said objective, cylindrically curving and supporting a second film having light sensitive means thereon with the axis of the cylinder in a given vertically tilted angular position with respect to the optical axis of said objective and with the concave side of said cylindrical curvature facing said objective, and projecting an image of said wide angle picture image on said first film onto said film having the light sensitive means thereon and controlling the related cylindrical curvatures of said films and the angular positions of said cylindrical axes with respect to each other and with respect to the optical axis of said objective so as to introduce controlled distortional characteristics in selected components of the resultant picture image on said second film which are such as to provide different amounts of vertical displacement in different parts of the resultant wide angle picture image intermediate the side edges thereof.

11. Photographic printing apparatus comprising an objective, a first film gate having a light aperture therein, said film gate being optically aligned with said objective at one side thereof, a second film gate optically aligned with said objective at the opposite side thereof, said film gates being of controlled related transverse shapes so as to receive strip films and support at least one in a controlled transversely curved shape, means for supporting said film gates for pivotal adjustment about transverse axes intersecting said optical axis at front and back substantially equal conjugate points of said objective, and means for projecting light through the first strip film and said aperture so that an image on the first film may be re-imaged by said objective upon the film supported by the other of said film gates.

12. A method of printing and of altering selective components of a wide angle picture image having controlled distortional characteristics introduced therein when taking said picture and further having controlled distortional characteristics in selected components of said image as introduced by a subsequent printing technique, said method comprising transversely cylindrically curving and supporting a first film having the wide angle picture image embodying the previously controlled distortional characteristics thereon in a given vertical position and at a given angle of inclination relative to the optical axis of an associated printing objective and with the concave side of said first film facing said objective, transversely cylindrically curving and supporting a second film having light sensitive means thereon in a given position and at a given vertical angle of inclination with respect to the optical axis of said objective, and with the concave side of said second film toward said objective, and projecting the image on said first film onto said second film, whereby an image on said second film modified in accordance with the related positions of said films and said objective will be provided having different amounts of vertical displacement therein at locations intermediate the opposite side edges thereof.

13. A method of producing a wide angle picture image on film for use with a theater arrangement embodying a controlled audience area and given angle of viewing, a screen of controlled horizontal concave curvature, and a controlled position and angle of projection with respect to said screen and said audience area, said method comprising photographing on a recording medium a picture image and introducing in the photographed image certain distortional characteristics along the horizontal meridian theory which are controlled according to the curvature of the screen, the projection distance and angles of projection and viewing, altering by projecting said image onto a second recording meridian selective components of said photographic image to rectify side edge portions thereof while retaining said certain distortional characteristics in said photographic image, and further altering by projecting the image on said second medium onto a photosensitive film selective components of said second image while retaining said certain distortional characteristics and the rectified components, said altering of said last named components being controlled in accordance with a given preferred location and angle of viewing, curvature of the screen, and position and angle of projection, whereby the resultant picture when viewed on the screen will appear by a reproduction, well corrected for distortion, of the original photographed scene.

14. A method of producing a wide angle picture image on film for use with a theater arrangement embodying a controlled audience area and given angle of viewing, a screen of controlled horizontal concave curvature and a controlled position and angle of projection with respect to said screen and said audience area, said method comprising photographing on a recording medium a picture image and introducing in the photographed image certain distortional characteristics along the horizontal meridian thereof which are controlled according to the curvature of the screen, the projection distance and angles of projection and viewing, altering by projecting said image onto a second recording medium selective components of said photographic image to rectify side edge portions thereof while retaining said certain distortional characteristics in said photographic image, and further altering by projecting the image on said second medium onto a photosensitive film selective components of said second image while retaining said certain distortional characteristics and the rectified components, said altering of said last named components being controlled in accordance with a given preferred viewing location and angle of viewing, curvature of the screen and position and angle of projection, whereby components in the screen picture which normally will produce droop and keystone distortions will be corrected to reduce said distortions to a minimum when viewed by individuals adjacent said predetermined preferred viewing location in said audience area.

15. A method of producing a wide angle picture image on film for use with a theater arrangement embodying a controlled audience area, a wide angle screen of controlled horizontal concave curvature located at a given position relative to said audience area so as to provide a given angle of viewing to individuals adjacent a predetermined preferred viewing point centrally of the width of said audience area and removed vertically from a line extending normal to the surface of said screen at the center thereof, and a projector located at a given distance from and at a controlled acute angle with respect to said line normal to the surface of the screen, said method comprising photographing on a recording medium a wide angle picture image and simultaneously introducing into the photographed image distortional characteristics controlled according to the position and curvature of the wide angle screen, the distance and angle of projection, and said predetermined point in said audience area so as to provide a controlled positional relation to the components of said photographed image along the horizontal meridian thereof, further controlling by projecting said image onto a second recording medium the distortional characteristics of selected components in the side edge portions of said image to introduce a given rectification thereof while providing substantially no positional change in the components along said horizontal meridian, and further controlling by projecting the image on said second medium onto a photosensitive film the distortional characteristics of selected components of said photographed image so as to differently vertically displace portions thereof intermediate the opposite side edges thereof according to the curvature of the screen, the angle of viewing from said predetermined preferred viewing point in said audience area, and according to the distance and angle of projection of the picture image and while retaining the relative positional relation of the said components along said horizontal meridian, whereby the picture on said wide angle screen, when viewed by individuals adjacent said predetermined point, will appear to be well corrected for distortion and generally similar to the scene originally photographed.

16. A method of producing a wide angle picture image on film for use with a theater arrangement embodying an audience area, a wide angle screen and a projector, and with said wide angle screen being of controlled horizontal concave curvature and located at a given position relative to a predetermined preferred viewing point located in and centrally of the width of said audience area, so as to provide a wide angle of viewing of the picture provided by said film image when projected onto said screen to individuals adjacent said preferred viewing point, and with said projector being located at a given distance from and at a controlled acute vertical angle with respect to a line extending normal to the surface of the screen at the center thereof, said method comprising the step of photographically producing on a first film a first wide angle film picture image of a scene and simultaneously introducing into said first picture image distortional characteristics controlled according to the transverse dimension and curvature of said wide angle screen and the projection distance to be used between said projector and said screen, for best viewing from predetermined preferred viewing point, said first step introducing into said first film picture image a controlled positional relation of the components of said first picture image along the horizontal meridian thereof and which distortional characteristics progressively increase in related values from adjacent the center to the outer side edges thereof, photographically forming by optical projection on a second film a modified picture image derived from said first film picture image and simultaneously controlling by maintaining said second film in a curved and angular position during the formation thereof the distortional characteristics of selected components in side marginal portions of said modified picture image spaced vertically from the horizontal meridian thereof, so as to be different from the distortional characteristics of correspondingly laterally disposed components of the modified picture image at the horizontal meridian thereof, to thereby introduce into said modified image a rectification to objects in said scene when subsequently displayed on said screen, and further controlling, during the formation of said modified picture image, the distortional characteristics of selected components of said modified image intermediate the outer side edges thereof in a vertical direction in accordance with the curvature of the screen, and in accordance with the angle of projection of said modified picture image onto said screen, whereby said picture when viewed on said screen by individuals adjacent said predetermined preferred viewing point in said audience area will appear to be well corrected for and nearly free from keystone and droop effects and generally similar to the wide angle scene originally photographically recorded.

17. A method of producing a wide angle picture image on film for use with a theater arrangement embodying an audience area, a wide angle screen and a projector, and with said wide angle screen being of controlled horizontal concave curvature and located at a given position relative to a predetermined preferred viewing point located in and centrally of the width of said audience area so as to provide a given included wide angle of viewing of the picture provided by said film image when projected onto said screen to individuals adjacent said preferred viewing point, with said viewing point being removed vertically from a line extending normal to the surface of said screen at the center thereof, and with said projector being located at a given distance from and at a controlled acute vertical angle with respect to said line normal to the surface of the screen and on the side of said normal line opposite said predetermined viewing point in said audience area, said method comprising the step of photographically producing on a first film a first wide angle film picture image of a scene and simultaneously introducing into said first picture image distortional characteristics controlled according to the transverse dimension and curvature of said wide angle screen and the projection distance to be used between said projector and said screen, for best viewing from said predetermined preferred viewing point, said first step introducing into said first film picture image a controlled positional relation of the components of said first picture image along the horizontal meridian thereof and which distortional characteristics progressively increase in related values from adjacent the center to the outer side edges thereof, photographically forming by optical projection on second film a modified picture image derived from said first film picture image and simultaneously controlling by maintaining said second film in a curved and angular position during the formation thereof the distortional characteristics of selected components in side marginal portions of said modified picture image spaced vertically from the horizontal meridian thereof, so as to be different from the distortional charactertistics of correspondingly laterally disposed components of the modified picture image at the horizontal meridian thereof, to thereby introduce into said modified picture image a rectification to objects in said scene when subsequently displayed on said screen, and further controlling, during the formation of said modified picture image, the distortional characteristics of selected components of said modified image intermediate the outer side edges thereof in a vertical direction in accordance with the curvature of the screen, in accordance with the angle of projection of said modified picture image onto said screen and in accordance with the angle of viewing from said predetermined preferred viewing point in said audience area, whereby said picture when viewed on said screen by individuals adjacent said predetermined preferred viewing point in said audience area will appear to be well corrected for and nearly free from keystone and droop effects and similar to the wide angle scene originally photographically recorded.

18. The method of producing a distortion-containing image upon photographic film for use with a theater arrangement embodying a horizontally concavely curved viewing screen of predetermined curvature in front of an audience area and with a projector arranged in such vertically spaced relation as to project obliquely thereon, said method comprising optically projecting an image from a first photographic film onto a second photographic film while maintaining a portion of said second film in a predetermined transversely curved shape and at a predetermined vertical angle of tilt relative to a projection printing axis extending between said first and second films, said film curvature and angle of tilt being such as to provide to all portions of the image being formed on said second film intermediate the side edges thereof vertical displacements of varying predetermined amounts, the amounts of said vertical displacement being determined jointly by the horizontal concave curvature of said screen, and the distance and oblique relation of said projector relative to said screen, whereby when the image on the second film is projected onto said viewing screen a picture will be formed thereon which will appear to be nearly free from distortion to persons situated near a predetermined preferred viewing position in said audience area in front of said screen.

19. The method of producing a distortion-containing image upon photographic film for use with a theater arrangement embodying a wide angle horizontally concavely curved viewing screen of predetermined curvature in front of an audience area and with a projector arranged in such predetermined vertically spaced angular relation relative to said screen as to project obliquely thereon, said method comprising optically projecting a wide angle image from a first photographic film onto a portion of a second photographic film while maintaining said portion of said second film in a predetermined transversely curved shape and at a predetermined vertical angle of tilt relative to a projection printing axis extending between said first and second films, said film curvature and angle of tilt being such as to provide to all portions of the image being formed on said second film intermediate the side edges thereof vertical displacements of varying predetermined amounts, the amounts of said vertical displacement being determined jointly by the horizontal concave curvature of said wide angle screen, and the distance and oblique relation of said projector relative to a normal extending outwardly from the center of said screen, whereby when the image on said second film is projected onto said wide angle viewing screen by a projector so located a wide angle picture will be formed which will appear to be well corrected for distortion to persons situated generally near a predetermined preferred viewing position in said audience area.

20. The method of producing a distortion-containing photographic film image comprising the steps of photographically recording upon a first recording medium an optical image of a wide angle scene and simultaneously introducing into said image, along the horizontal meridian thereof, laterally foreshortened distortional characteristics which progressively increase at a predetermined rate from the center to the opposite side edges thereof, optically projecting said image so laterally foreshortened onto a second recording medium which has its upper and lower edge portions shaped so as to have formed thereon a second image having said laterally foreshortened distortional characteristics along its transverse horizontal meridian and to have in its upper and lower side edge portions, laterally elongated characteristics which are sufficient to provide an upright appearance in objects within said photographed scene near the opposite side edge portions thereof, and thereafter optically projecting said second image onto a photosensitive film while said film is held in a predetermined transversely bent shape so as to cause the image being formed thereon to be progressively curved and displaced vertically to one side of a horizontal straight line interconnecting the opposite side edges of the images at their midpoints thereof, and while retaining in the image being formed said laterally foreshortened distortional characteristics and said side edge rectification, whereby when said photographic film image is used in a projector in a theatre arrangement embodying a wide angle viewing screen of predetermined transverse concave curvature and said projector is located at a position a given distance from said viewing screen and vertically spaced a preselected angular amount relative to a line of sight extending from a predetermined preferred viewing point in said audience area to the center of said screen, a picture will be formed upon said screen which will appear to persons near said point to be well corrected for distortion.

21. Photographic printing apparatus comprising an objective, first film supporting means for maintaining a portion of a first strip film having photographic images thereon at a predetermined illumination position in said apparatus, said first film supporting means being optically aligned with said objective at one side thereof, second film supporting means for maintaining a portion of a second strip film in a predetermined position optically aligned with said objective at the opposite side thereof, said first and second film supporting means being of controlled related transverse shapes so as to receive said portions of strip film and support at least one of said portions in a controlled transversely curved cylindrical shape, means for maintaining a given tilted relation between the optical axis of said objective and the longitudinal axis of each strip film, said portions also being disposed at operational conjugates of said objective, and means for projecting light through the portion of said first strip film at said illumination position so that same will be illuminated and will be reimaged by said objective upon said portion of said second film, whereby all portions of the image being formed on said second film at points intermediate the side edges thereof will be vertically displaced with reference to said side edges and in varying predetermined amounts which are directly and jointly dependent upon said transverse shapes provided said films by said film supporting means and upon said tilted relation.

22. The method of producing a distortion-containing image upon photographic film for use with a theatre arrangement embodying a controlled audience area, a screen of controlled horizontal concave curvature in front of said audience area and located at a given position relative thereto so as to provide a given horizontal angle of viewing to individuals adjacent a predetermined preferred viewing position in said audience area, a projector located at a given distance from said screen and at such predetermined vertically spaced relation relative to said screen as to project obliquely thereon, said method comprising supporting a first film having a distortion-containing image thereon with predetermined progressively increasing amounts of distortion along the horizontal meridian thereof from the center to the opposite side edges of said image in a given angular position relative to a projection printing axis, supporting a second photographic film at a predetermined vertical angle of tilt relative to said projection printing axis extending between said first and second films, and optically projecting said distortion-containing image from said first film onto a portion of said second film while controlling the transverse shapes, the related angles of tilt of said films and said optical projection so as to provide to all portions of the image being formed on said second film intermediate the side edges thereof vertical displacements of varying predetermined amounts while retaining the related proportions of said distortion along said horizontal meridian, the amounts of said vertical displacements and distortion along said horizontal meridian being determined jointly by the horizontal concave curvature of said screen, the distance of said projector from said screen and the oblique relation of said projector relative to said screen, whereby when the image on said second film is projected onto said concavely curved screen from said projection position a picture image will be formed thereon which will appear to persons situated generally near said predetermined viewing position to be well corrected for distortion.

References Cited in the file of this patent
UNITED STATES PATENTS
751,347    Scheimpflug ___________ Feb. 2, 1904
(Other References on following page)

UNITED STATES PATENTS

| | | |
|---|---|---|
| 1,199,460 | Featherstone | Sept. 26, 1916 |
| 1,212,424 | Tillotson | Jan. 16, 1917 |
| 1,651,574 | Beechlyn | Dec. 6, 1927 |
| 1,829,634 | Chretien | Oct. 27, 1931 |
| 1,867,199 | Wildhaber | July 12, 1932 |
| 1,909,282 | Kirsch | May 16, 1933 |
| 1,912,661 | Seymour | June 6, 1933 |
| 1,957,782 | Hyde | May 8, 1934 |
| 1,967,057 | Irvine | July 17, 1934 |
| 1,978,559 | Zimmermann | Oct. 30, 1934 |
| 2,081,187 | Stuart | May 25, 1937 |
| 2,157,138 | Mendez | May 9, 1939 |
| 2,280,206 | Waller et al. | Apr. 21, 1942 |
| 2,476,521 | Waller | July 19, 1949 |
| 2,544,116 | Waller et al. | Mar. 6, 1951 |